(12) United States Patent
Kumar et al.

(10) Patent No.: US 8,918,795 B2
(45) Date of Patent: *Dec. 23, 2014

(54) HANDLING AND REPORTING OF OBJECT STATE TRANSITIONS ON A MULTIPROCESS ARCHITECTURE

(71) Applicant: International Business Machines Corporation, Armonk, NY (US)

(72) Inventors: Aditya Kumar, Austin, TX (US); Kevin Wendzel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/678,748

(22) Filed: Nov. 16, 2012

(65) Prior Publication Data

US 2013/0074095 A1  Mar. 21, 2013

Related U.S. Application Data

(63) Continuation of application No. 12/970,348, filed on Dec. 16, 2010, now Pat. No. 8,464,269.

(51) Int. Cl.
*G06F 9/46* (2006.01)
*G06F 9/54* (2006.01)
*G06F 9/50* (2006.01)

(52) U.S. Cl.
CPC ............... *G06F 9/544* (2013.01); *G06F 9/461* (2013.01); *G06F 9/50* (2013.01)
USPC ......................................... 718/104; 718/105

(58) Field of Classification Search
CPC .................................. G06F 9/50; G06F 9/461
See application file for complete search history.

(56) References Cited

U.S. PATENT DOCUMENTS

| | | | |
|---|---|---|---|
| 5,220,653 A * | 6/1993 | Miro | 718/107 |
| 5,799,150 A | 8/1998 | Hamilton et al. | |
| 7,870,256 B2 * | 1/2011 | Talwar et al. | 709/226 |
| 2009/0144566 A1 | 6/2009 | Bletsch et al. | |

OTHER PUBLICATIONS

U.S. Appl. No. 12/970,348, entitled Handling and Reporting of Object State Transitions on a Multiprocess Architecture, filed Dec. 16, 2010.

* cited by examiner

*Primary Examiner* — Camquy Truong
(74) *Attorney, Agent, or Firm* — Patterson & Sheridan LLP (57) ABSTRACT

Techniques are described for managing states of an object using a finite-state machine. The states may be used to indicate whether an object has been added, removed, requested or updated. Embodiments of the invention generally include dividing a process into at least two threads where a first thread changes the state of the object while the second thread performs the processing of the data found in the object. While the second thread is processing the data, the first thread may receive additional updates and change the states of the objects to inform the second thread that it should process the additional updates when the second thread becomes idle.

14 Claims, 9 Drawing Sheets

|  | OLD (PENDING) RESOURCE STATE | NEW RESOURCE STATE | MERGED STATE |
|---|---|---|---|
| ROW 1 | ANY | ADDED | N/A (IMPOSSIBLE COMBINATION) |
| ROW 2 | UNCHANGED, RARE CHANGE, STATIC CHANGE | UNCHANGED | OLD RESOURCE STATE |
| ROW 3 | UNCHANGED, RARE CHANGE | REMOVED, STATIC CHANGE, RARE CHANGE, REQUESTED | NEW RESOURCE STATE |
| ROW 4 | STATIC CHANGE | REMOVED, REQUESTED | NEW RESOURCE STATE |
| ROW 4 | STATIC CHANGE | STATIC CHANGE, RARE CHANGE | OLD RESOURCE STATE |
| ROW 5 | ADDED, REQUESTED | REMOVED | N/A (JUST DELETE RESOURCE FROM CACHE) |
| ROW 5 | ADDED, REQUESTED | UNCHANGED, STATIC CHANGE, RARE CHANGE, REQUESTED | OLD RESOURCE STATE |
| ROW 6 | REMOVED | UNCHANGED, REMOVED, STATIC CHANGE, RARE CHANGE, REQUESTED | STATIC CHANGE |

HANDLING AND REPORTING OF OBJECT STATE TRANSITIONS ON A MULTIPROCESS ARCHITECTURE

CROSS-REFERENCE TO RELATED APPLICATIONS

This application is a continuation of co-pending U.S. patent application Ser. No. 12/970,348, filed Dec. 16, 2010. The aforementioned related patent application is herein incorporated by reference in its entirety.

BACKGROUND

Many processes that transmit data through input/output ports, across different computing platforms, or across the networks require a large amount of time to execute. These processes may receive requests faster than they can be executed. The traditional solution is to buffer each request in a queue and handle each subsequent request once the preceding request is complete. This solution, however, has drawbacks. For example, if requests are added to the queue faster than they can be serviced, then the memory buffer may become full.

Of course, one could construct a buffer large enough to queue these requests, but this wastes resources in the instances when the requests can be processed as fast as they are received. Moreover, if subsequent requests in a queue make the preceding requests irrelevant (i.e., a first received request updates data, but a later request changes the data back) then the system wastes processing time encoding and decoding both requests and updating the data needlessly.

Another known solution is dividing up the process into a series of processes that may be done in parallel—e.g., multiple threads. This enables incoming requests to be processed while the preceding request is finished. Accordingly, when the preceding request is finished, some amount of processing has already been completed on the subsequent request. Subdividing increases throughput and minimizes the size of the buffer. Nonetheless, subdividing a request may corrupt data that is shared between the multiple processes—e.g., one thread changes data associated with a memory object while a separate thread is currently transmitting that data to an I/O device. Additionally, some processes must be done sequentially which nullifies the benefits of using multiple threads.

SUMMARY

Embodiments of the invention provide a method, system and computer program product for managing the state of a hardware component by receiving a request and setting a state value of a resource object to a first value according to the first request, wherein the first state value indicates that the first request is pending. The method, system and computer program product include processing data contained in the resource object based on the first state value, wherein the data describes the status of the hardware component. During processing of the data based on the first state value, the method, system and computer program product receive at least two additional requests and assign the state value of the resource object to a second state value based on the at least two additional requests, wherein the second state value is determined using pre-determined logic. After completing the processing of the data based on the first state value, the method, system and computer program product process the data of the resource object based on the second state value, wherein the second state value indicates that a different request received during the processing of the data based on the first state value is pending.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

In general, the processing of an object in memory can be divided into different sub-processes or threads. Multiple threads work together to complete the same process and share resources (e.g., memory) which enables a processor to quickly switch between threads. In a multiprocessor or multi-core system, the threads or tasks may run at the same time, with each processor or core running a particular thread. This multitasking permits different parts of the process to be done at different times. Accordingly, a subdivided process may be executed quicker than an undivided process.

This multitasking may be applied to updating cached states of a hardware component. In general, the system may create an object in cache which records the state of the hardware component, a unique ID identifying the component, and any data describing the status of the component (e.g., temperature, the component type, energy consumption or purpose). This object is then updated, processed, and sent to a client application. This process, however, may be divided into separate threads. In one embodiment, a finite-state machine is implemented using two threads. A "finite-state machine" is a behavior model composed of a finite number of states, transitions between those states, and actions associated with each state. Specifically, a preprocessing thread may perform the initial processing of the object by updating the state in the cache before instructing a transmitting thread to process and send the object to the client application. While the transmitting thread is doing the bulk of the processing, the preprocessing thread is free to receive any updates or changes to the object representing the hardware component. If the hardware component is updated, the preprocessing thread can preprocess the object (e.g., update the associated state) and again instruct the transmitting thread to transmit the updated data once the thread is idle. Thus, the preprocessing is already complete when the transmitting thread becomes available to finish processing the request.

Moreover, if subsequent requests make the preceding requests irrelevant, then the subdivided process is able to save system resources by avoiding intermediate states. For example, assume a hardware component was added to a system. The preprocessing thread receives the request and updates the state associated with the object to indicate that the hardware component was added. The preprocessing thread then hands-off the request to the transmitting thread which receives the request, processes the object, and sends the necessary information to the client application. Meanwhile, the hardware component sends updated information. The preprocessing thread again preprocesses the object and updates the state, but because the transmitting thread is busy, the preprocessing thread does not instruct the transmitting thread to send the updated data. However, before the transmitting thread is finished processing the original request, the hardware component is removed from the system. Again, the preprocessing thread preprocesses the object and changes the state. Now, when the transmitting thread finishes the original request, the preprocessing thread has already updated the state of the object to reflect that the hardware component was removed, thereby saving the transmitting thread from wasting resources and time processing the intermediate state (i.e., when the hardware component sent updated information).

In another embodiment of the present invention, a resource object includes a unique ID which identifies a particular hardware component and a state which records that a hardware component has been changed—i.e., the hardware component has been removed, added, or changed. A preprocessing thread waits for either a query from a client application requesting information about a particular hardware component or an update from a hardware component that describes a change in the component. Once a query or update is received, the preprocessing thread uses the state to determine how to process the query or update and then constructs a message instructing the transmitting thread to finish the processing. Advantageously, the preprocessing thread is the only thread that changes the state of the object, thereby preventing data corruption. If the state of the object is updated while the transmitting thread is busy, the preprocessing thread updates the object and instructs the transmitting thread to again process the object once it becomes idle. The transmitting thread performs the rest of the processing on the object and sends the necessary data to the client application.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
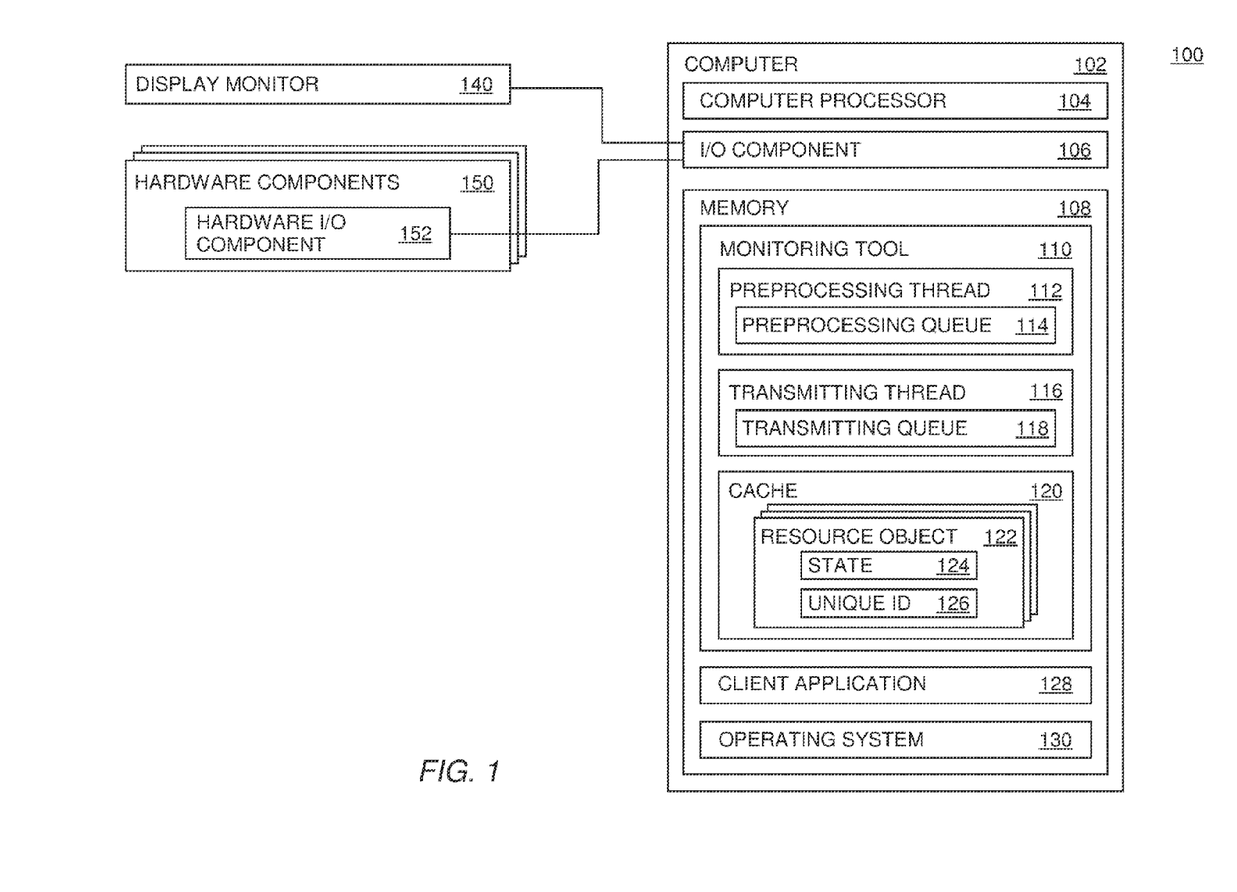
FIG. 1 is a block diagram illustrating a system for monitoring hardware components, according to embodiments of the invention.

FIG. 1 is a block diagram illustrating a system for monitoring hardware components, according to embodiments of the invention. As shown, the system 100 includes a computer 102, a display monitor 140 and a hardware component 150. Generally, the computer 102 receives updates from the hardware component 150 which generally specify that the hardware component 150 was added, deleted or updated. Moreover, a hardware component 150 may transmit information concerning its status—e.g., temperature, power consumption or functionality (whether the hardware component 150 is currently operating). The computer 102 processes the data and may output the update to the display monitor 140 to be viewed by a user.

The hardware components 150 may either be located externally to the computer 102, such as in an external I/O enclosure, or internally. Specifically, the hardware component 150 may be an external/internal hard disk, peripheral component interconnect (PCI) card, PCI Express card, video card, sound card, random access memory (RAM), read only memory (ROM), adapter, flash memory, or other types of volatile and/or non-volatile memory. A hardware component 150 includes a hardware I/O component 152 for transmitting to the computer 102 the status of each hardware component 150. In one embodiment, the status of the hardware components 150 is used by IBM®'s Active Energy Manager (AEM) to measure, monitor, and manage the energy consumed by the hardware component 150. In general, AEM extends the scope of energy management to include facility providers to enable a more complete view of energy consumption within the datacenter and is used in IBM BladeCenter®, POWER, System x, and System z servers.

The computer 102 includes a computer processor 104, I/O component 106 and memory 108. The computer processor 104 may be any processor capable of performing the functions described herein. In one embodiment, the computer 102 uses multiple computer processors 104 to enable multiple threads to execute at the same time. The I/O component 106 communicates with the display monitor 140 to output the updates received from the client application 128 as well as receives data from the hardware I/O component 152 to transmit updated data to the monitoring tool 110. In one embodiment, the I/O component 106 may include a user interaction device (e.g., a keyboard or mouse) to permit a user to request information from the system 100 (e.g., the current status of each hardware component 150).

The memory 108 includes an operating system 130, client application 128 and monitoring tool 110. The operating system 198 may be any operating system 198 capable of performing the functions described herein. The client application 128 receives input from monitoring tool 110, such as when a new hardware component 150 is added. Alternatively, the client application 128 may proactively send a request to the monitoring tool 110 for information regarding a hardware component or components 150. The client application 128 may then send that information to a display monitor 140 or use it in a scheme such as AEM to manage power capping and power saving modes. One of ordinary skill will recognize that the client application 128 make be located remotely from the computer 102.

The monitoring tool 110 includes a preprocessing thread 112, a transmitting thread 116 and a cache 120. The monitoring tool 110 may be implemented by a hypervisor to track the current status and functionality of multiple hardware resources (e.g., hardware components 150) on multiple external I/O enclosures. When the status of a hardware component 150 changes, the monitoring tool 110 sends a message to the client application 128 indicating what resource changed and what type of change occurred (e.g., a hardware component 150 was added, removed, or updated). The monitoring tool 110 receives either (1) an update from a hardware component 150 or (2) a request from the client application 128 for the status of one or more hardware components 150. An update from a hardware component 150 may include a change in the component's status (e.g., functionality, present condition, energy consumption or temperature). A request from a client application 128 instructs the monitoring tool 110 to send data concerning a hardware component 150 irrespective of whether that component was recently updated. As used herein, a "request" received by the preprocessing thread 112 refers to both a hardware component 150 sending updated data and a query from the client application 128 requesting information on a particular hardware component or components 150. The monitoring tool 110 receives these requests and stores them in the preprocessing queue 114 to wait until the preprocessing thread 112 is ready to execute them.

To process the received requests, the monitoring tool 110 divides the process into two threads: a preprocessing thread 112, and a transmitting thread 116. After the preprocessing is finished, the preprocessing thread 112 hands-off the processing to the transmitting thread 116 which finishes processing the request and sends the requested or updated information to the client application 128. The transmitting thread 116 also includes a transmitting queue 118 for receiving messages from the preprocessing thread 112. Further details concerning this hand-off will be discussed below.

The cache 120 is a portion of the memory 108 that is accessible to both the preprocessing thread 112 and transmitting thread 116. The cache 120 may be implemented by any suitable data structure, for example, a map structure which uses pre-defined key values (e.g., a unique ID 126) to distinguish between hardware components 150. The cache 120 may include at least one resource object 122. Each object 122 corresponds to a specific hardware component 150. For example, if a PCI card was added as a hardware component 150, the monitoring tool creates a resource object 122 in the cache 120 to store updates, changes, and the status of the PCI card. These resource objects 122 include a state 124, which determines whether the resource object 122 should be processed by the preprocessing or transmitting thread 112, 116, and a unique ID 126, which the monitoring tool 110 uses to associate the resource object 122 with a specific hardware component 150. The unique ID 126 may represent, for example, the location (e.g., the port) of a hardware component 150 that is stored on an external I/O enclosure which is unique to that component. Although not shown, the resource object 122 may store other information about the hardware component 150—e.g., the power consumed, type, functionality or temperature. In one embodiment, the cache 120 is only accessible by the preprocessing thread 112. The preprocessing thread 112 retrieves the necessary data associated with an object 122, creates a message containing the requested data, and sends that message the transmitting thread 116 to be processed. This process will be discussed in greater detail below.

One of ordinary skill in the art will recognize that the process performed by the monitoring tool 110 may be subdivided further or done by only one undivided process. Moreover, the monitoring tool 110 may use other methods to perform the subdivided process, such as two independent processes which have access to a shared file or two operating systems that share data storage (e.g., a database).

Figure 2:
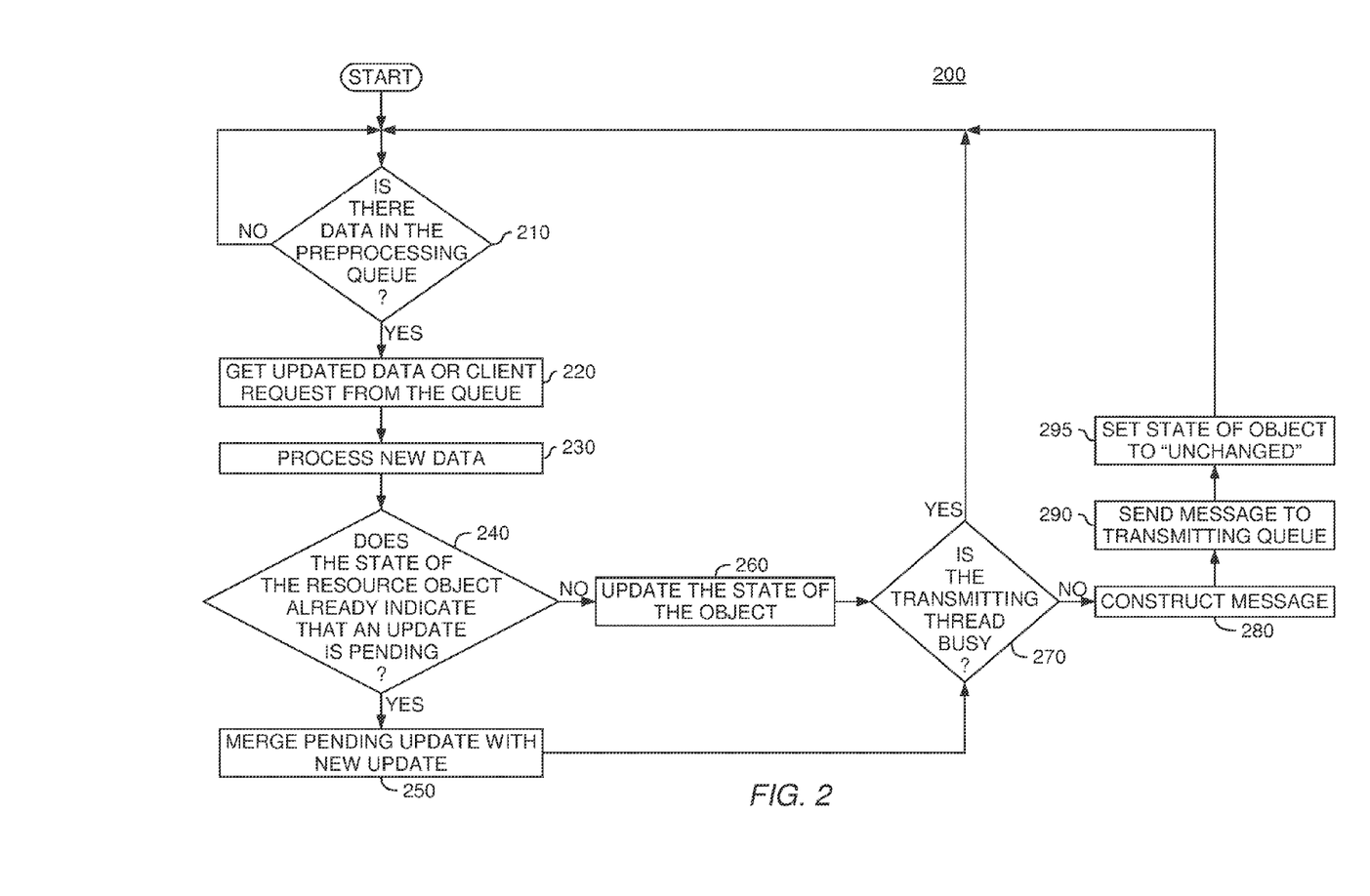
FIG. 2 is a flow diagram illustrating a method of creating a finite-state machine using a preprocessing thread, according to embodiments of the invention.

FIG. 2 is a flow diagram illustrating a method of creating a finite-state machine using a preprocessing thread, according to embodiments of the invention. The process 200 starts at step 210 after the monitoring tool 110 relays a received request to the preprocessing queue 114. The preprocessing thread 112 continues to monitor the preprocessing queue 114 waiting for a request to arrive. At step 220, the preprocessing thread 112 retrieves the request from the preprocessing queue 114 and begins to execute the request. In one embodiment, a request consists of two types: one, an update sent by a hardware component 150 which must be stored in the corresponding resource object 122, and two, a request from the client application 128 for the monitoring tool 110 to return information concerning a particular hardware component—e.g., a user wants to know the hardware component 150 that consumes the most power.

At step 230, the preprocessing thread 112 preprocesses the request by updating the state 124 of the resource object 122. For example, a hardware component may have sent an update to the monitoring tool 110 which establishes the amount of power it is currently consuming. The preprocessing thread 112 would then match the hardware component 150 to the unique ID 126 of the corresponding resource object 122 and store the updated power consumption in the resource object 122. Additionally, the preprocessing thread 112 updates the state 124. The present embodiment defines six states 124, although other embodiments can define any number of states.

First, a state 124 of "Unchanged" is assigned when a resource object 122 has not changed since the last time data was sent to the client application 128. This state 124 informs the preprocessing thread 112 that no data within the resource object 122 needs to be processed by the transmitting thread 116.

Second, the state 124 of "Added" is assigned when a new hardware component 150 communicates with the monitoring tool 110 for the first time. This state 124 informs the preprocessing thread 112 that data within this resource object 122 should be relayed to the transmitting thread 116.

Third, the state 124 of "Removed" indicates that the hardware component 150 was removed since the last time information was sent to the client application 128. This state 124 instructs the transmitting thread 116 to inform the client application 128 that the hardware component 150 is removed. The resource object 122 is also removed from the cache 120.

Fourth, the state 124 of "Static Change" indicates that new data was received from a hardware component 150 since the last time information was transmitted to the client application 128 and that the data changed was of a type that never should have been changed. This state 124 informs the preprocessing thread 112 that the updated data within this resource object 122 should be relayed to the transmitting thread 116.

Fifth, the state 124 of "Rare Change" indicates that new data was received from a hardware component 150 since the last time information was transmitted to the client application 128 and that the data changed is rarely changed. This state 124 informs the preprocessing thread 112 that changed data within this resource object 122 should be relayed to the transmitting thread 116.

Sixth, the state 124 of "Requested" indicates that the information within the resource object 122 was requested by the client application 128. The preprocessing thread 112 then hands-off the request to the transmitting thread 116 irrespective of whether the resource object 122 was recently sent. Accordingly, this state 124 informs the preprocessing thread 112 that the requested data stored within this resource object 122 should be relayed to the transmitting thread 116. The specific logic describing how the preprocessing thread 112 assigns a state 124 will be discussed below.

After a state 124 is assigned, at step 240, the preprocessing thread 112 determines whether the resource object 122 already has an assigned state 124 that requires the transmitting thread 116 to send the resource object 122 to the client application 128—i.e., the state 124 is any other state besides Unchanged. If so, then there is a conflict. In general, at step 250 the preprocessing thread 112 chooses the state which takes precedence (i.e., the state that requires the most information to be sent) and merges the pending update with the new update. As an example, consider the situation where a new hardware component 150 is added and then immediately updated (e.g., the hardware component 150 sends to the monitoring tool 110 its initial temperature measurement). First, the preprocessing thread 112 would receive the request from the preprocessing queue 114 and create a new resource object 122 with the state 124 of Added. However, before the information concerning the new hardware component 150 can be relayed to the client application 128, the preprocessing thread 112 receives the second request to update the information found in the new resource object 122. After making the change, the preprocessing thread 112 tries to change the state 124 to "Rare Change" but detects that the state 124 (i.e., Added) already indicates that the information found within the resource object 122 is pending and has not yet been sent to the client application 128. Recognizing the conflict between states 124, the preprocessing thread 112 chooses the state that transmits the most complete set of data, which in this case would be the state 124 of Added since the client application was never made aware of the new hardware component 150. Notably, the state of Added may require that the same amount of data (and probably more) be sent to the client application 128 as the state of Rare Change. Accordingly, the client application still receives the same information that would have been transmitted if the object 122 has a state 124 of Rare Change.

As another example of how the finite-state machine may resolve a conflict, assume that a hardware component 150 sends an update to the monitoring tool 110 with new power consumption measurements. The preprocessing thread 112 then updates the corresponding resource object 122 and changes the state 124 to Rare Change. Before this information is transmitted to the client application 128, however, the unique ID 126 of a resource object 122 changes—i.e., the hardware component 150 now occupies a different location. Because a change in location requires both a new unique ID 126 and a new resource object 122, the preprocessing thread attempts to assign the state 124 of the old resource object 122 as Removed. However, there is a conflict since the state of Rare Change indicates that an update is already pending. In this case, the preprocessing component 112 does change the state 124 to Removed since the updated data will be irrelevant given that the hardware component 150 has now changed locations and been assigned a new resource object 122 and unique ID 126.

Figure 4:
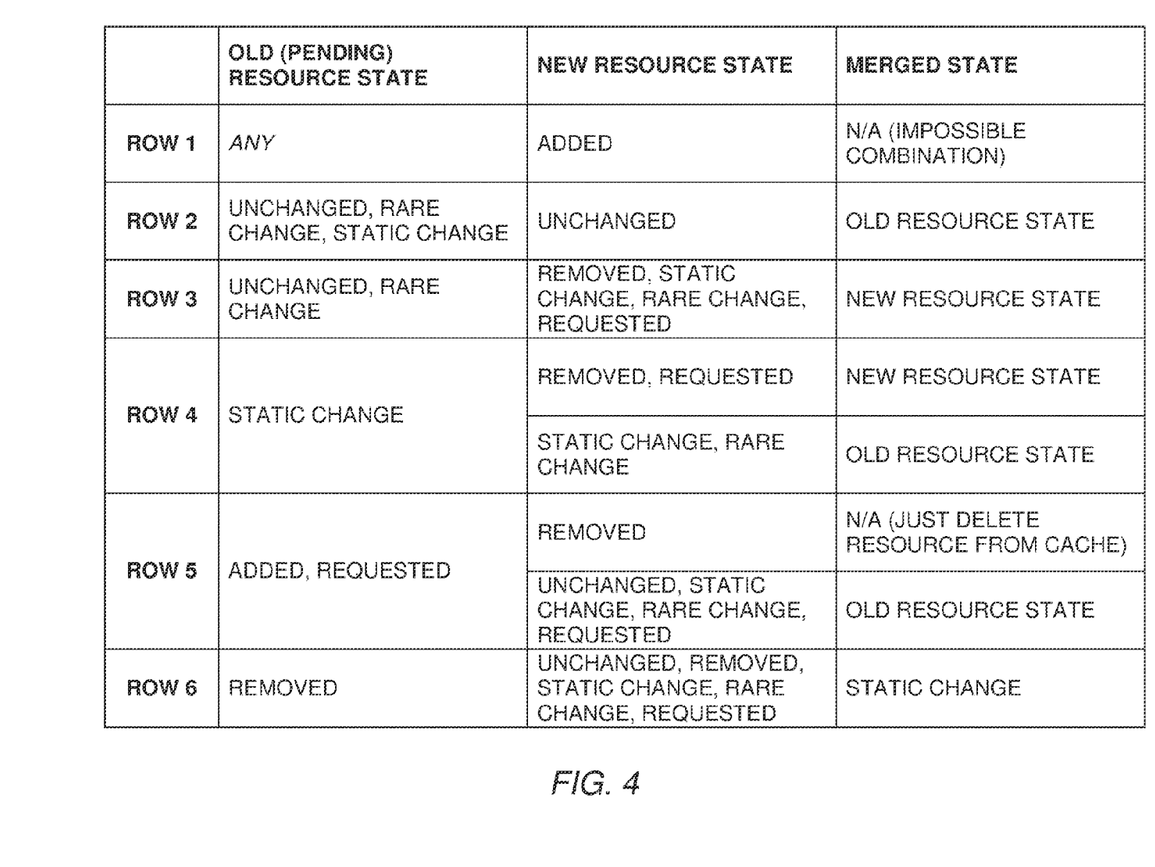
FIG. 4 illustrates a table containing logic for merging conflicting states, according to embodiments of the invention.

FIG. 4 illustrates a table containing logic for merging conflicting states, according to embodiments of the invention. As shown, the Pending Resource State column defines the current state 124 of the resource object 122. In the previous example, this would be the state 124 of Rare Change. The New Resource State column lists the state 124 which a new received request gives to a resource object before the preprocessing thread 112 can hand-off the previous request to the transmitting thread 116—i.e., before the client application 128 is made aware of the update. In the previous example, this is the state 124 of Removed. The Merged State column provides the resulting state 124 of the resource object after the conflict is resolved. In the previous example, this is also the state 124 of Removed. Each row identifies a particular scenario and illustrates the logic used by the preprocessing thread 112 to merge states 124.

Row 1 illustrates that there can be no conflict when a new request is received that indicates the new state 124 of a resource object 124 should be labeled as Added since, by definition, this is the first time the preprocessing thread 112 has received a communication from a hardware component 150 in that location. Stated differently, a state 124 of Added is the first state assigned to a resource object 122.

At Row 2, the old state is Unchanged, Rare Change or Static Change. If a new request is received from a hardware component 150 that does not require information to be passed to the client application 128, then the new state is Unchanged. However, if the merged state was changed to Unchanged, then the data associated with the pending update would not be sent to the client application 128. Accordingly, the preprocessing thread 112 sets the merged state to the old state (i.e. Unchanged, Rare Change, or Static Change) so the pending update is still transmitted.

At Row 3, if the old state 124 is Unchanged or Rare Change and the new desired state 124 is Removed, Static Change, Rare Change or Requested, then the preprocessing thread 112 assigns the new state as the merged state 124. In such a case, the finite-state machine avoids sending irrelevant data (e.g., sending updated data when the hardware component 150 has already been removed) and processing intermediate steps (e.g., a state of Static Change and Requested also transmits the same information to the client application 128 as a state of Rare Change).

At Row 4, if the old state is Static Change and a new state is Removed or Requested, then the merged state is the new state. Similarly, this logic avoids sending irrelevant data. If the new state is Static Change or Rare Change, then the old state is maintained. Because a Static Change accounts for the same updates as Rare Change, the preprocessing thread 112 keeps the original state 124. Note that when the old state is Static Change and the new state is also Static Change, the merged state could be considered to be either since the same information will be transmitted to the client application 128.

At Row 5, if the old state is Added or Requested and the new state is Removed then neither state is assigned. The preprocessing thread 112 sends a message to the transmitting thread 116 to inform the client application 128 that the hardware component 150 has been removed and deletes the resource object 124 from the cache 120. In another embodiment, if the client application 128 never received a message that the hardware component 150 was added, then the preprocessing thread 112 may remove the resource object 124 without informing that client application 128 that the hardware component 150 was either added or deleted. If the new state is Unchanged, Static or Rare Change, or Requested, then the merged state is the old state (i.e., Added or Requested). The state of Added must be kept 124 since before a hardware component can be updated, the client application 128 needs to know of its existence. Moreover, in one embodiment, the state 124 of Added instructs the processing threads to send the same, if not more, data to the client application 128 than would be sent with a state 124 of Static or Rare Change. Similarly, the state 124 of Requested requires the same, if not more, updated data to be transmitted as would have been sent by any of the new states. In other words, the possible new states are a subset of Requested. Accordingly, a state of Requested instructs the preprocessing thread 112 to send the at least the same data to the transmitting thread 116 as would the possible new states.

At Row 6, if the old state is Removed and a new request is received, then the hardware component 150 is no longer removed from the system. The preprocessing thread 112 assigns the merged state as Static Change so that the resource object 122 is deleted and recreated, thereby preserving any changes that occurred after the object 122 was marked for removal.

If the state 124 of the resource object 122 does not indicate that an update is pending (i.e., the state is Unchanged), at step 260, the preprocessing thread 112 can assign the corresponding state 124 without having to resolve a conflict using the logic represented by FIG. 4.

At step 270, the preprocessing thread 112 determines if the transmitting thread 116 is currently busy. Because the embodiment uses a finite-state machine, the state 124 of a resource object 122 indicates whether a update is pending, enabling the preprocessing thread 112 to continue to process received data—i.e., return to step 210. If the transmitting thread 270 is not busy, at step 280 the preprocessing thread 112 constructs a message which indicates which resource object 122 has a pending update. A "message" may be any type of data or data structure that performs the functions described herein. In one embodiment, only the preprocessing thread 112 may access the cache 120. Accordingly, the preprocessing thread 112 evaluates the state 124 of the object 122 and determines what data in the object should be placed in the message and sent to the transmitting queue 188 based on the assigned state 124. For example, if the state 124 is Added, the message contains all of the data found in the object 122 associated with the newly added hardware component 150. If the state is Rare Change, the message contains the data from the object 122 that has been updated. At step 290, the preprocessing thread 112 sends the message to the transmitting queue 118. The transmitting thread 116 then fetches the message and finishes processing the request by transmitting the data contained in the message to the client application 128.

After the request has been handed-off to the transmitting thread 116, the preprocessing thread 112 changes the state 124 of the object to Unchanged (unless the previous state 124 was Removed in which case the resource object 122 is deleted). Advantageously, in this embodiment, only the preprocessing thread 112 changes the state 124 of the resource object 122, thereby requiring only one thread to manage conflicts.

In another embodiment, the preprocessing thread 112 may determine that at step 210 the data sent to the preprocessing queue 114 may be the same data sent previously—i.e., redundant data. For example, a hardware component 150 may send periodic updates concerning the temperature. One update may the same as a preceding update. In such a case, the monitoring tool 110 may determine that nothing has changed by comparing the received data to data already stored in the object 122 in the cache 120. The process 200 would continue to loop at step 210 until updated data was received from the hardware components 150.

Figure 3:
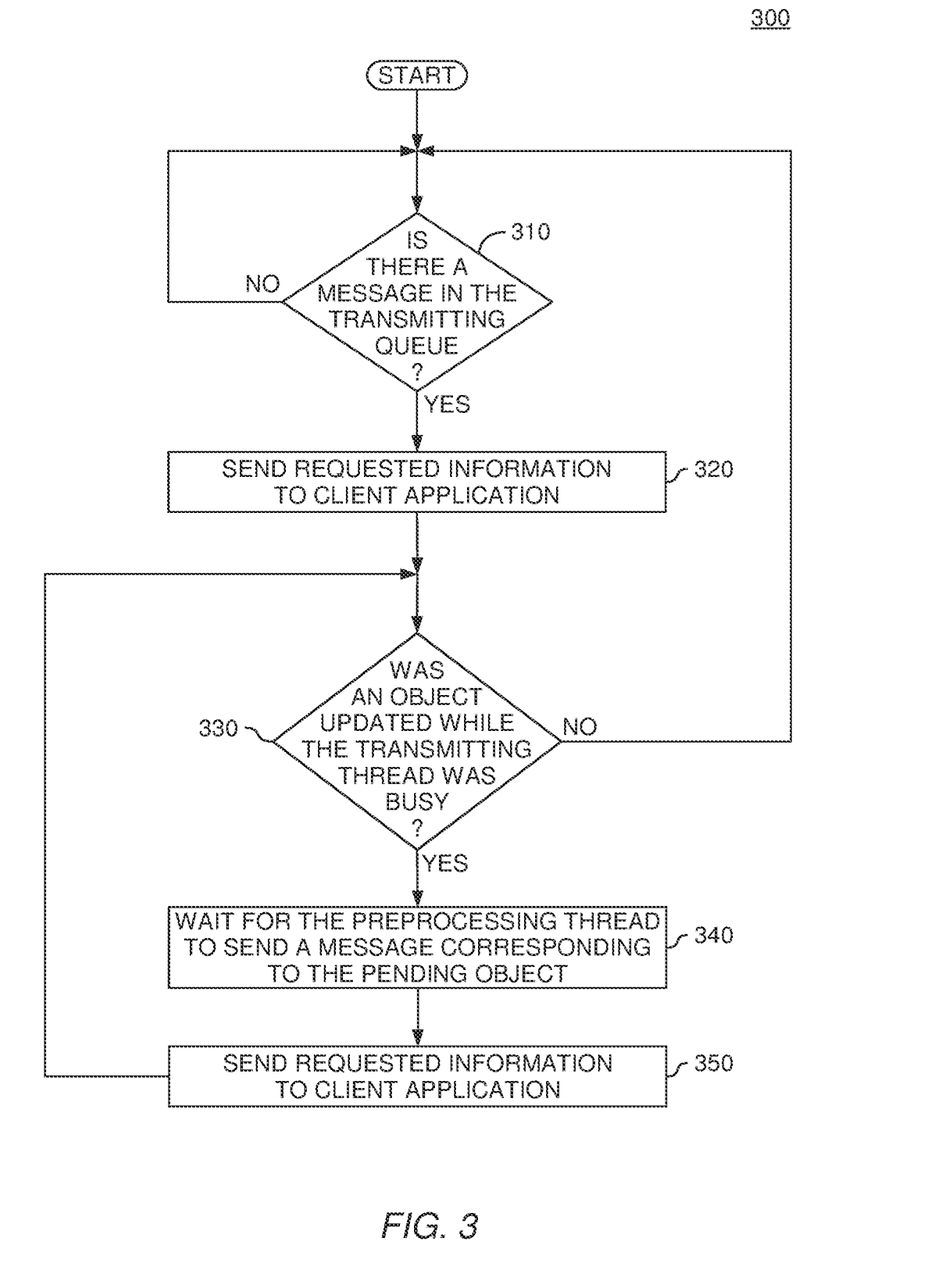
FIG. 3 is a flow diagram illustrating a method of creating a finite-state machine using a transmitting thread, according to embodiments of the invention

FIG. 3 is a flow diagram illustrating a method of creating a finite-state machine using a transmitting thread, according to embodiments of the invention. As shown, at step 310, the transmitting thread 116 waits for a message to be sent to the transmitting queue 118. Note that in the discussion regarding FIG. 2, the preprocessing thread 112 sends a message to the transmitting queue 118 only when the transmitting thread 116 is idle (or waiting). After a message is received, at step 320 the transmitting thread 116 completes the request. If the request was an update from a hardware component 150, the transmitting thread 116 finishes processing the request and sends the updated information to the client application 128. In one embodiment, the client application then outputs the new information to the display monitor 140. If the request was sent by the client application 128 (e.g., requesting the temperature of a hardware component 150) the transmitting thread 116 finishes processing the request and sends the information specified in the request to the client application 128. Advantageously, the transmitting thread 116 may do the majority of the processing involved when responding to a request, leaving the preprocessing thread 112 free to update states 124 and resolve conflicts. One of ordinary skill in the art will recognize that the transmitting thread 116 may be subdivided into additional threads.

After finishing the request, at step 330 the transmitting thread 116 queries the preprocessing thread 112 to determine if a resource object 122 was updated while the transmitting thread 116 was busy processing the request (not shown in FIG. 2). Because the preprocessing thread 112 may perform the preprocessing of a request faster than the transmitting thread 116 finishes processing and sending data to the client application 128, the preprocessing thread 112 may have marked several resource objects 122 as pending—i.e., changed the corresponding states 124. Advantageously, by maintaining one state inside the resource object 122, the multiple threads may wait indefinitely before having to fully process the received updates. How the finite-state machine manages these timing issues will be discussed in greater detail below.

If a state 124 of a resource object 122 indicates an update is pending, at step 340 the transmitting thread 116 waits for the preprocessing thread 112 to construct a message. Once that message is received, at step 350 the transmitting thread 116 finishes processing the request and sends the updated information to the client application 128. This process continues until all of the resource objects 124 marked pending have been processed. Throughout the entire process, the preprocessing thread 112 may continue to receive requests and update states 124. For example, the preprocessing thread 112 may update a state 124 of a resource object 122 to Added while the transmitting thread 116 is busy. After the transmitting thread 116 finishes and informs the preprocessing thread 112 that it is idle, the preprocessing thread 112 sends a new message to the transmitting queue 118. While the transmitting thread 116 is processing that request, the preprocessing thread 112 may receive another update. Accordingly, the transmitting thread 116 again queries the preprocessing thread 112 to determine if any states 124 were updated while the thread was busy. This loop continues until all pending updates have been completed. Note that each time the preprocessing thread 112 hands-off a request to the transmitting thread 116 (i.e., sends a message to the transmitting queue 118), the preprocessing thread 112 marks the corresponding state (or states) 124 as Unchanged to indicate that an update is no longer pending.

FIG. 5-9 are sequence diagrams illustrating methods of the finite-state machine, according to embodiments of the invention. FIG. 5-9 illustrate specific examples of the finite-state machine operating in various situations using time as a frame of reference. In general, the sequence diagrams include four actors: hardware microcode, the preprocessing thread 112, the transmitting thread 116 and the client application 128. The hardware microcode compiles an update for a hardware component 150 and transmits the update to the finite-state machine (i.e., the two processing threads). The functions and attributes of the preprocessing thread 112, transmitting thread 116 and the client application 128 were discussed previously.

Figure 5:
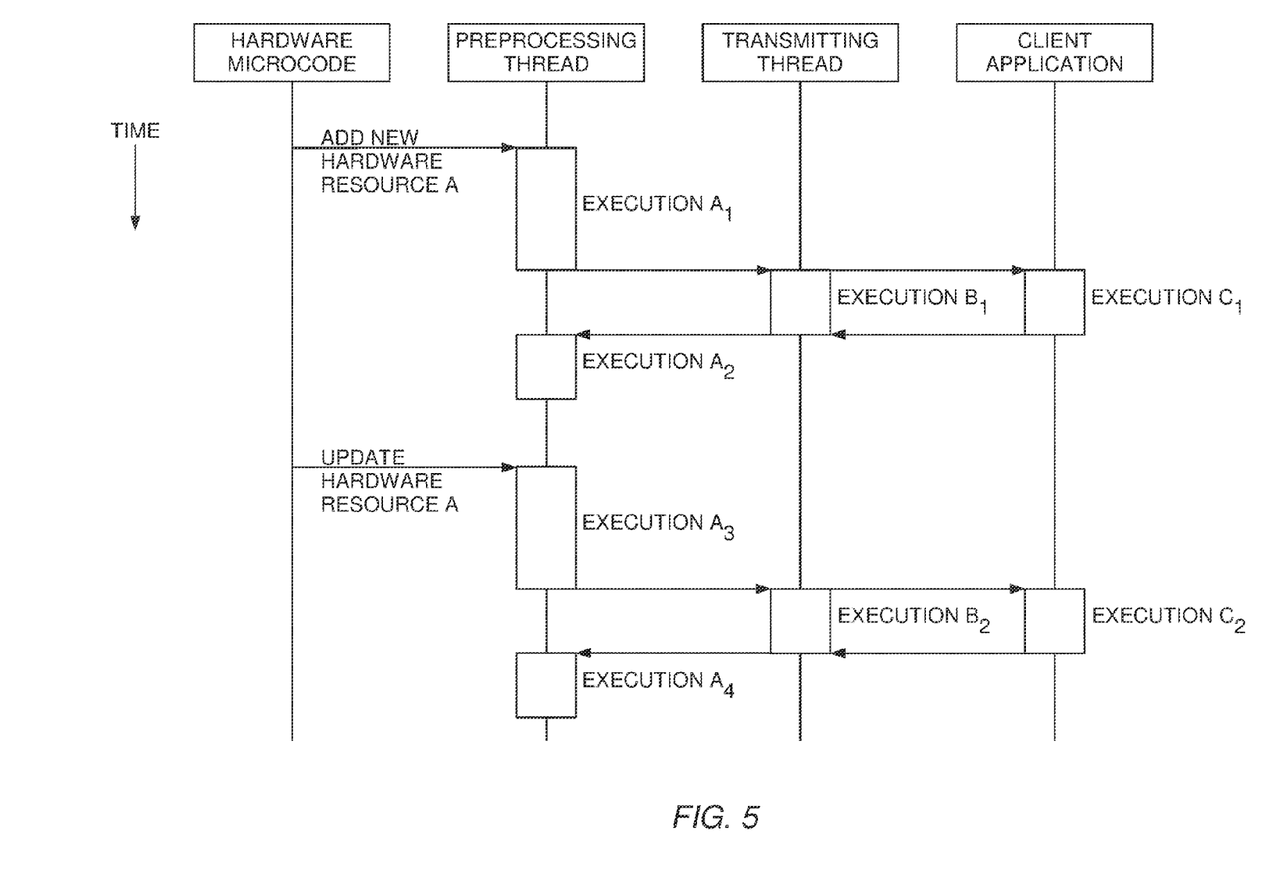
FIG. 5 is a sequence diagram, according to embodiments of the invention.

FIG. 5 is a sequence diagram, according to embodiments of the invention. As shown, Execution $A_1$ begins when the hardware microcode sends an update or request to the preprocessing thread 112 to add new hardware resource A. During the preprocessing stage, the preprocessing thread 112 adds a resource object 122 to the cache 120 which represents hardware component A and changes the state 124 of the new resource object 122 to Added. Because the transmitting thread 116 is not busy processing a request, the preprocessing thread 112 sends a message to the transmitting queue 118 and changes the state 124 to Unchanged, thereby completing Execution $A_1$. Execution $B_1$ begins when the transmitting thread 116 retrieves the message. The transmitting thread 118 finishes processing the request and transmits the necessary information to the client application 128. The client application 128 receives the information and begins Execution $C_1$ which may include outputting to the display monitor 140 a graphic indicating that new hardware component A was added. Once completed, the client application 128 informs the transmitting thread 116 which then finishes processing the request and queries the preprocessing thread 112 to determine if any resource objects 122 were marked as pending while the transmitting thread 116 was running Execution $B_1$. During Execution $A_2$, the preprocessing thread 112 determines that no states 124 indicate that an update is necessary. Accordingly, the four actors wait until the hardware microcode sends an update regarding hardware component A (e.g., the power currently being consumed). This triggers Execution $A_3$ which changes the corresponding state 124 to Rare Change and, because the transmitting thread 116 is idle, sends a message to the transmitting queue 118. Execution $A_3$ ends when the preprocessing thread 112 again changes the state 124 to Unchanged after the message has been sent to the transmitting queue 118. Execution $B_2$ performs a similar function as Execution $B_1$. After the client application 128 completes Execution $C_2$, the transmitting thread 116 again queries the preprocessing thread 112 to determine if any resource objects 122 were marked as pending while Execution $B_2$ was running If not, Execution $A_4$ ends and the preprocessing and transmitting threads 112, 116 wait for another request from either the hardware microcode or the client application 128.

Figure 6:
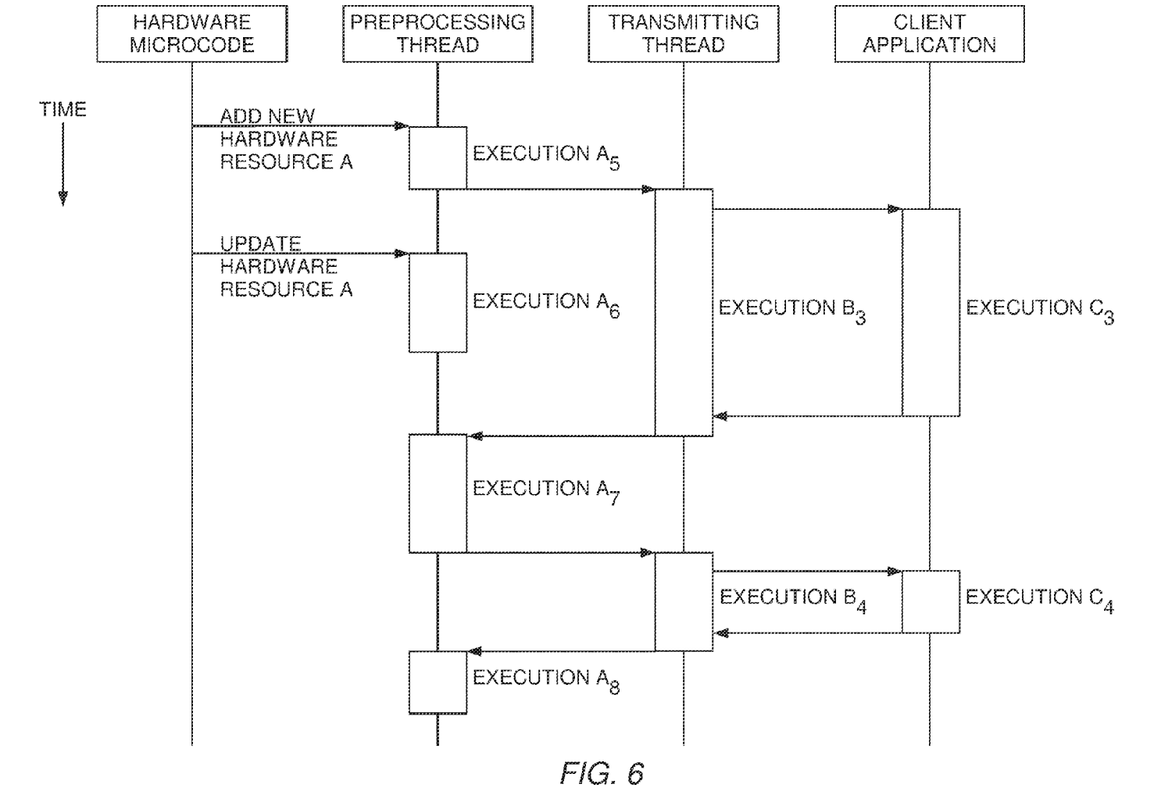
FIG. 6 is a sequence diagram, according to embodiments of the invention.

FIG. 6 is a sequence diagram, according to embodiments of the invention. The sequence begins when the hardware microcode sends a request to the preprocessing thread 112 to add new hardware component A. During Execution $A_5$, the preprocessing thread 112 creates a new resource object 122 and sets the state 124 to Added. Because the transmitting thread 116 is idle, the preprocessing thread 112 sends a hand-off message to the transmitting thread 116 and changes the state 124 to Unchanged. During Execution $B_3$, the transmitting thread 116 finishes processing the request and sends the necessary information to the client application 128 for it to process (i.e., Execution $C_3$). Simultaneously, the hardware microcode sends an update for hardware component A to the preprocessing thread 112 which changes the state 124 of the resource object 122 to Rare or Static Change to indicate that the resource object 122 must be processed. Because the transmitting thread 116 is busy with Execution $B_3$, the preprocessing thread 112 does not send the message to the transmitting queue 118. After Execution $C_3$ completes, Execution $B_3$ queries the preprocessing thread 112 to ascertain whether a resource object 122 is marked as pending. During Execution $A_7$, the preprocessing thread 112 scans the cache 120 and discovers the resource object 122 corresponding to hardware resource A with a state 124 of Rare or Static Change. Because the transmitting thread 116 is idle, the preprocessing thread 112 sends the message to the transmitting queue 118 and changes the state 124 to Unchanged. Execution $B_4$ and $C_4$ are completed before the transmitting thread 116 again queries the preprocessing thread 112 to determine if any resource objects 122 are marked pending. During Execution $A_8$, the preprocessing thread 112 determines that all resource objects 122 have been updated.

Figure 7:
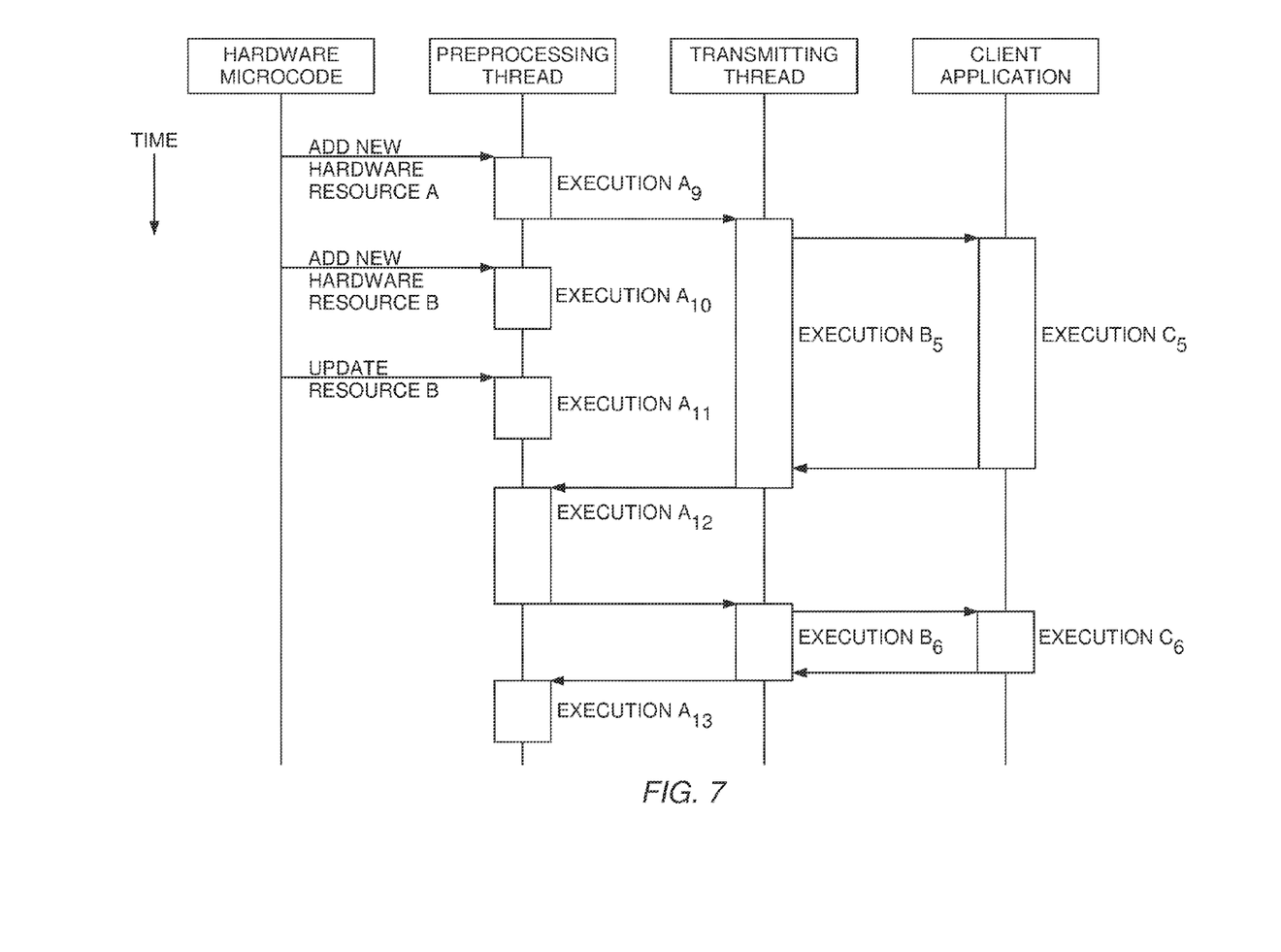
FIG. 7 is a sequence diagram, according to embodiments of the invention.

FIG. 7 is a sequence diagram, according to embodiments of the invention. The sequence begins when the hardware microcode sends a request to add new hardware resource A. Executions $A_9$, $B_5$, and $C_5$ in turn process the request. During Executions $B_5$, and $C_5$, the hardware microcode sends two new requests to the preprocessing thread 112, spawning Executions $A_{10}$ and $A_{11}$. The first request adds new hardware resource B which requires the preprocessing thread 112 during Execution $A_{10}$ to add a resource object 122 to the cache 120 and set the state 124 to Added. The second request is an update of hardware resource B which requires the preprocessing object to again change the state 124. Because the state 124 of Added already indicates that the resource object 122 is pending, the preprocessing thread 112 must resolve the conflict according to the conflict logic shown in FIG. 4. According to Row 5 of FIG. 4, the preprocessing thread 112 uses the old state as the merged state (i.e., Added) and waits for the transmitting thread 116 to become idle. During Execution $A_{12}$, preprocessing thread 112 responds to the query sent from the transmitting thread 166 and sends a message indicated that the resource object 122 for hardware resource B is pending. During Executions $B_6$ and $C_6$, the processing of the request is finished and the transmitting thread 116 alerts the client application 128 that new hardware resource B was added. Of course, following the hand-off, the preprocessing thread 112 changes the state 124 corresponding to hardware resource B to Unchanged.

Figure 8:
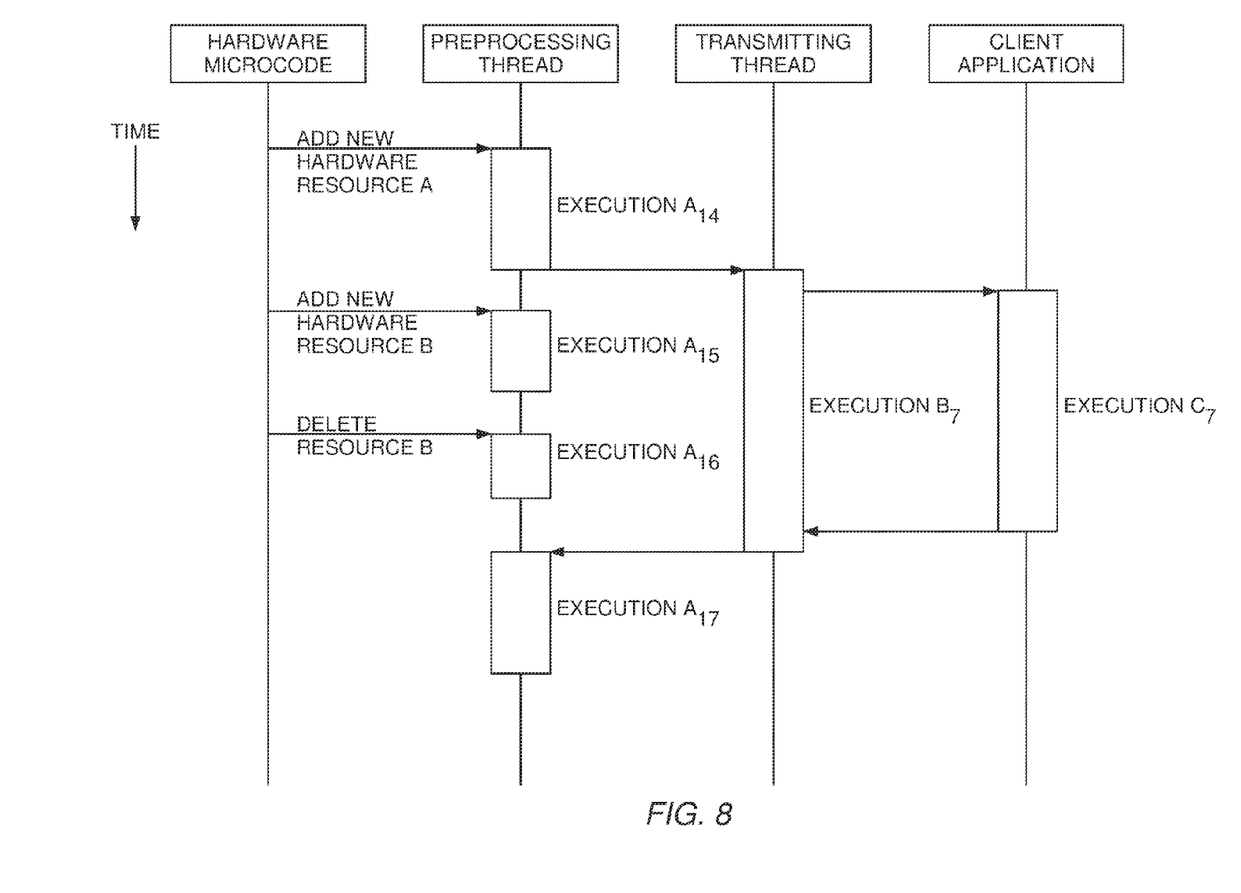
FIG. 8 is a sequence diagram, according to embodiments of the invention.

FIG. 8 is a sequence diagram, according to embodiments of the invention. The sequence begins when the hardware microcode informs the preprocessing thread 112 that new hardware resource A was added. Executions $A_{14}$, $B_7$, and $C_7$ in turn process the request. During Executions $B_7$, and $C_7$, the hardware microcode sends two new requests to the preprocessing thread 112, spawning Executions $A_{15}$ and $A_{16}$. The first request informs the preprocessing thread 112 that new hardware resource B was added. In response, the preprocessing thread 112 creates a new resource object 122 with a state 124 of Added during Execution $A_{15}$. The second request informs the preprocessing thread 112 that hardware resource B was deleted. This request requires the preprocessing thread 112 to change the state 124 to Removed, however, there is a conflict. Accordingly, the preprocessing thread 112 decides which state 124 should become the merged state based on FIG. 4. In this case, Row 5 indicates that the preprocessing thread 112 should simply remove the corresponding resource object 122 from the cache 120. Because the finite-state machine uses at least two threads, the machine avoids wasting processing time informing the client application 128 that a new hardware resource was added if it was removed before the message was even sent.

Figure 9:
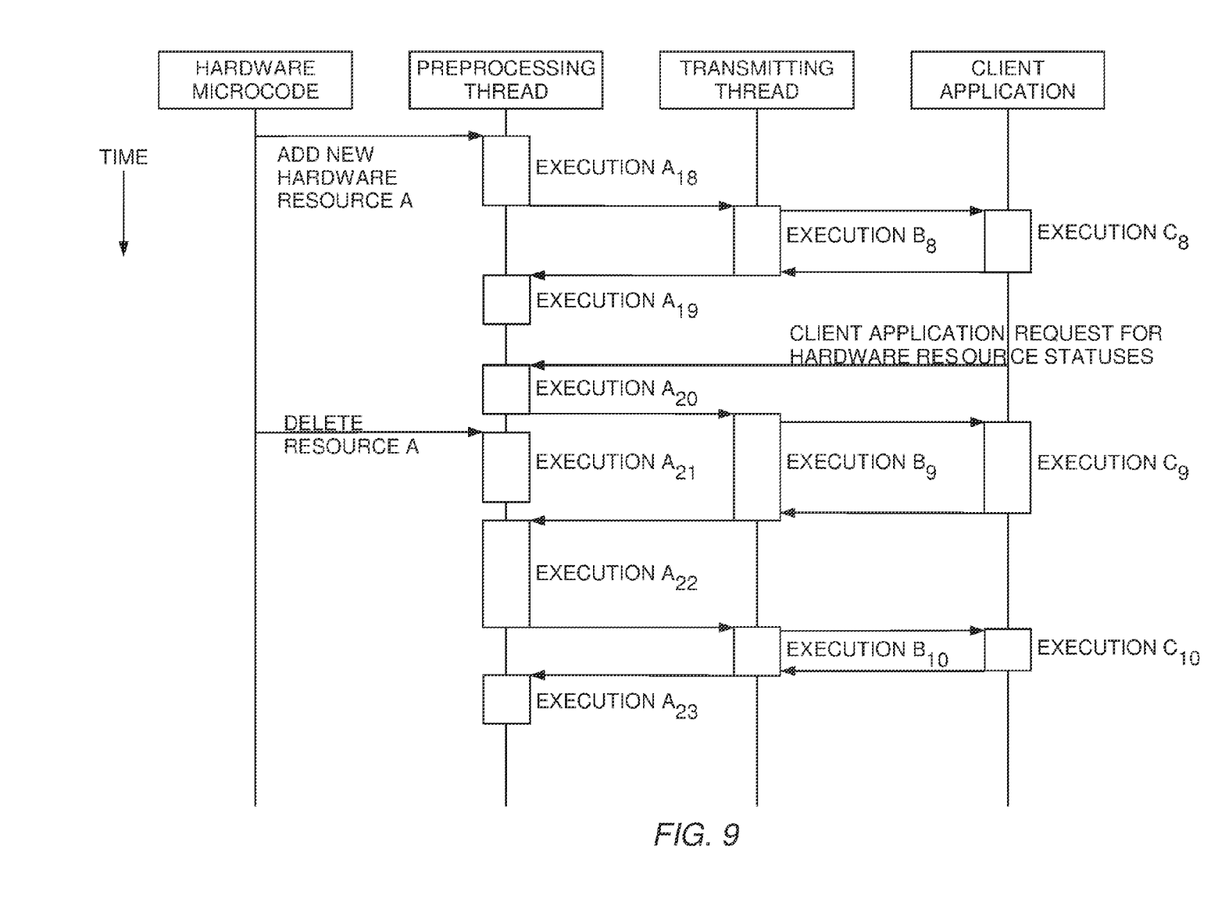
FIG. 9 is a sequence diagram, according to embodiments of the invention.

FIG. 9 is a sequence diagram, according to embodiments of the invention. The sequence begins when the hardware microcode sends a request to add hardware resource A. Executions $A_{18}$, $B_8$, and $C_8$ process the request in turn. Because no additional requests were received during Executions $B_8$, and $C_8$, the preprocessing thread 112 informs the transmitting thread 116 that no resource objects 122 are pending during Execution $A_{19}$. The preprocessing thread 112 then receives a request for the status of hardware resource A from the client application 128. The preprocessing thread changes the state 124 to Requested and, because the transmitting thread 116 is idle, sends the appropriate message to the transmitting queue 118. During Executions $B_9$, and $C_9$, both the transmitting thread 116 and client application 128 process the requested information respectively. Meanwhile, the hardware microcode instructs the processing thread 112 via a new request to delete hardware resource A. During Execution $A_{21}$, the preprocessing thread 112 updates the state 124 of the resource object 122 corresponding to hardware resource A to Removed and waits for the transmitting thread 116 to finish Execution $B_9$. During Execution $A_{22}$, the preprocessing thread 112 determines whether any resource object 122 is pending and discovers that hardware resource A's resource object 122 has a state 124 of Removed. Accordingly, the preprocessing thread hands-off the processing to the transmitting thread 116 and deletes the resource object 122. During Execution $B_{10}$, the transmitting thread 116 processes the request and transmits the removal information to the client application 128 for further processing, i.e., Execution $C_{10}$. Once completed, the transmitting thread 116 queries the preprocessing thread 112 during Execution $A_{23}$ and determines that no resource objects 122 are pending.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of maintaining a state of a first hardware component, comprising:
   receiving a request relating to the first hardware component;
   assigning a state value stored in a first resource record corresponding to the first hardware component to a first state value based on the request, wherein the first state value indicates that the request is pending;
   processing, by operation of one or more computer processors, data stored in the first resource record based on the first state value, wherein the data describes a status of the first hardware component;
   during processing of the data based on the first state value:
      receiving at least two updates relating to a second hardware component, each update indicating a respective state change of the second hardware component,
      determining a merged state value by evaluating the at least two state changes of the second hardware component using pre-determined logic, and
      assigning the merged state value to a second resource record; and
   after completing the processing of the data based on the first state value, processing data stored in the second resource record based on the merged state value, wherein the merged state value indicates that a different request received during the processing of the data based on the first state value is pending.

2. The method of claim 1, further comprising, after the processing based on the first state value has begun, changing the first state value to a non-pending state value that indicates that a request is no longer pending.

3. The method of claim 1, wherein the first and second resource records includes a unique ID that identifies the location of the first and second hardware components respectively.

4. The method of claim 1, wherein a plurality of hardware components are each associated with a separate resource record.

5. The method of claim 4, further comprising:
   after completing the processing based on the first state value, determining whether a state value of at least one of the separate resource records has been changed indicating that a subsequent request received while processing based on the first state value is pending; and
   upon determining that the state value of at least one of the separate resource records has changed, processing the data of the separate resource record associated with the subsequent request based on the changed state value.

6. The method of claim 1, wherein the status of the first and second hardware components is at least one of the following: temperature, type, energy consumption, or functionality of the first or second hardware components.

7. The method of claim 1, wherein the data which describes the first hardware component is used in an Active Energy Manger.

8. The method of claim 1, wherein the first hardware component is the same component as the second hardware component and the first resource record is the same as the second resource record.

9. A computer-implemented method of maintaining a state of a hardware component, comprising:
   receiving a first request;
   assigning a state value of a resource object associated with the hardware component to a first state value based on the first request, wherein the first state value indicates that the first request is pending, wherein a plurality of hardware components are each associated with a separate resource object;
   processing, by operation of one or more computer processors, data contained in the resource object based on the first state value, wherein the data describes a status of the hardware component;
   during processing of the data based on the first state value:
      receiving a first subsequent request concerning at least one hardware component,
      updating the state value of the resource object corresponding to the at least one hardware component based on the first subsequent request, wherein the changed state value indicates that the first subsequent request is pending,
      after receiving the first subsequent request, receiving a second subsequent request concerning the at least one hardware component, and
      assigning the state value of the resource object based on the first and second subsequent requests and pre-determined logic; and
   after completing the processing of the data based on the first state value, processing data contained in the resource object based on the second state value, wherein the second state value indicates that a different request received during the processing of the data based on the first state value is pending.

10. The method of claim 9, further comprising, after the processing based on the first state value has begun, changing the first state value to a non-pending state value that indicates that a request is no longer pending.

11. The method of claim 9, wherein the resource object includes a unique ID that identifies the location of the hardware component.

12. The method of claim 9, further comprising:
   after completing the processing based on the first state value, determining whether a state value of at least one of the separate resource objects has been changed; and
   upon determining that the state value of at least one of the separate resource objects has changed, processing the data of the separate resource object based on the changed state value.

13. The method of claim 9, wherein the status of the hardware component is at least one of the following: temperature, type, energy consumption, or functionality of the hardware component.

14. The method of claim 9, wherein the data which describes the hardware component is used in an Active Energy Manger.

* * * * *